United States Patent
Dutertre et al.

(10) Patent No.: US 10,080,331 B2
(45) Date of Patent: Sep. 25, 2018

(54) BALING ROLLER AND ROUND AGRICULTURAL BALER WITH SUCH A ROLLER

(71) Applicant: Deere & Company, Moline, IL (US)

(72) Inventors: Matthieu Dutertre, Chemaudin (FR); Pascal Gresset, Auxon Dessous (FR)

(73) Assignee: DEERE & COMPANY, Moline, IL (US)

( * ) Notice: Subject to any disclaimer, the term of this patent is extended or adjusted under 35 U.S.C. 154(b) by 677 days.

(21) Appl. No.: 14/700,793

(22) Filed: Apr. 30, 2015

(65) Prior Publication Data

US 2016/0000014 A1    Jan. 7, 2016

(30) Foreign Application Priority Data

Jul. 1, 2014   (DE) .................. 10 2014 212 713

(51) Int. Cl.
| | | |
|---|---|---|
| *A01F 15/18* | (2006.01) | |
| *A01F 15/08* | (2006.01) | |
| *A01F 15/07* | (2006.01) | |

(52) U.S. Cl.
CPC .......... *A01F 15/0833* (2013.01); *A01F 15/07* (2013.01); *A01F 15/085* (2013.01); *A01F 15/18* (2013.01); *A01F 2015/079* (2013.01); *A01F 2015/0795* (2013.01); *A01F 2015/186* (2013.01)

(58) Field of Classification Search
CPC ...... A01F 15/07; A01F 15/071; A01F 15/085; A01F 15/0833; A01F 15/0883; A01F 15/106; A01F 2015/079; A01F 2015/0795; A01F 15/18; A01F 2015/186

USPC .................... 100/87, 88, 89; 492/30, 37
See application file for complete search history.

(56) References Cited

U.S. PATENT DOCUMENTS

| | | | | |
|---|---|---|---|---|
| 532,749 | A * | 1/1895 | Banister ................. | A01F 15/07 100/89 |
| 653,191 | A * | 7/1900 | Treese ..................... | A01F 15/07 100/168 |
| 1,834,466 | A * | 12/1931 | MacKenzie ........... | B30B 9/3082 100/161 |
| 4,163,419 | A * | 8/1979 | Molitorisz ............ | B30B 11/222 100/89 |
| 2008/0184691 | A1 | 8/2008 | Horchler | |
| 2010/0236191 | A1* | 9/2010 | Paillet ................. | A01F 15/0715 53/210 |

(Continued)

FOREIGN PATENT DOCUMENTS

| | | |
|---|---|---|
| DE | 2656896 A1 | 6/1978 |
| EP | 0404100 A1 | 12/1990 |
| EP | 2387874 A1 | 11/2011 |

OTHER PUBLICATIONS

DE Search Report dated Nov. 2, 2015 (4 pages).
DE Search Report dated Mar. 31, 2015 (10 pages).

*Primary Examiner* — Jimmy T Nguyen

(57) ABSTRACT

A baling roller for a round agricultural baler includes a roller body with a jacket surface, which encloses the circumference and the length of the roller body. Furthermore, radially extending elevations are located, on the jacket surface, over the circumference and the length of the roller body. In order to optimize the pressing effect of the baling roller, the elevations on the jacket surface have a greater radial extension on the end areas of the roller body than in an area of the roller body, lying between the end areas.

12 Claims, 7 Drawing Sheets

(56) References Cited

U.S. PATENT DOCUMENTS

2011/0009251 A1\* 1/2011 Derscheid ............... A01F 15/18
                                                                492/30

\* cited by examiner

BALING ROLLER AND ROUND AGRICULTURAL BALER WITH SUCH A ROLLER

CROSS-REFERENCE TO RELATED APPLICATIONS

Pursuant to 35 USC § 119, this application claims the benefit of and priority to German patent application no. 102014212713.0, filed on Jul. 1, 2014, which is herein incorporated by reference in its entirety.

FIELD OF THE DISCLOSURE

The invention concerns a baling roller for a round agricultural baler, comprising a roller body with a jacket surface, which encloses the circumference and the length of the roller body, and several elevations that extend radially, which are located on the jacket surface over the circumference and the length of the roller body. Furthermore, the invention concerns a round agricultural baler with such a roller.

BACKGROUND

Round agricultural balers are known. Agricultural crops, such as straw, grass, or grains, are formed into round bales in round balers thereby and wrapped with a wrapping material, for example, a net, foil or binding yarn. Such round balers have a picking and feeding device for the crops to be pressed, by means of which the crops are introduced into a feed opening of a baling chamber. The baling chamber comprises several baling rollers arranged in a circle, which extend over the width of the baling chamber between two side walls and are driven in a rotatory manner. For a better carrying or a better conveyance of the crops introduced into the pressing chamber, the baling rollers are provided with several elevations, which are distributed over the circumference of the baling rollers and which extend in a radial direction of the baling roller in the same thickness and over the length of the baling roller. Often, however, in this arrangement and formation of baling rollers, in particular, with dry crop conditions and with crops that have been cut short, there are accumulations of crops on the side areas of the round bales or near the side walls of the baling chamber. The shape of the round bale can then differ from the desired shape of the rotation cylinder, so that the shape of the round bale develops in the direction of a rotation hyperboloid (the jacket surface of the round bale is curved inwards in the direction of the rotation axis of the round bale, different from a straight line). This, in turn, can lead to problems with a subsequent net supply, so that the net cannot lie in an orderly manner around the side edges on the front surfaces of the completely pressed round bale, or is not even carried through the round bale.

SUMMARY

The goal which is the basis of the invention is to be found in indicating a baling roller of the type mentioned in the beginning, by means of which the aforementioned problems are overcome.

The goal is attained, in accordance with the invention, by the teaching of Patent claim 1. Other advantageous developments and refinements of the invention can be deduced from the subclaims.

In accordance with the invention, a baling roller of the type mentioned in the beginning has elevations on the jacket surface, which, on front surface end areas of the roller body have a greater radial extension than in an area of the roller body lying between the end areas. As a result of the elevations with different thicknesses along the length of the roller body or as a result of the elevations which are thicker on the end areas of the roller body, stronger pressing forces, on the end areas of the baling roller, are exerted on the round bales than in the area lying between the end areas. In this way, it is possible to avoid the establishing of a deformity, or a shape of the round bale that differs from a cylindrical shape can be effectively counteracted. As a consequence, the aforementioned defects or problems with the net binding can be avoided or at least minimized.

The elevations on the jacket surface of the roller body can be formed by strip-shaped bands. They can be, for example, steel or sheet metal strips which are welded in the longitudinal direction or also in the shape of spirals along the length of the roller body. It is likewise conceivable for the elevations to be directly formed into the jacket surface material by, for example, a sheet metal formation process. It is also conceivable for the elevations to be formed by nubs arrayed next to one another, welded also, or by means of a suitable sheet metal formation.

The bands have a greater thickness on the side end areas of the roller body than in the area of the roller body lying between the end areas. One-part bands with a thickness course differing over the length of the roller body can thereby be used, whose areas which are formed with a greater thickness extend into the end areas. Alternatively, bands with a varying thickness and length can be used, wherein shorter bands, only covering the end areas of the roller body, with a greater thickness in the circumferential direction, are arranged next to longer bands with a smaller thickness. The latter can then also extend to the end areas on one side or on both sides, which can offer manufacturing-technical advantages, for example, for the upgrading of already present baling rollers which are equipped with bands with a uniform thickness course.

Furthermore, the bands on the side end areas of the roller body are formed lying above one another, so that the greater thickness is formed into the end areas, for example, by a double layer of bands, wherein a short band, covering an end area of the roller body, is placed or welded on the end of a long band, projecting into the individual end area. This variant is also suitable for the upgrading of already present pressing rollers with bands with a uniform thickness course, as are used in the state of the art.

The baling rollers described above are, in particular, suitable for use in round agricultural balers with a constant pressing chamber.

With the aid of the drawing which shows an embodiment example of the invention, the invention and other advantages and advantageous refinements and developments of the invention are described and explained in detail below.

DETAILED DESCRIPTION

Figure 1:
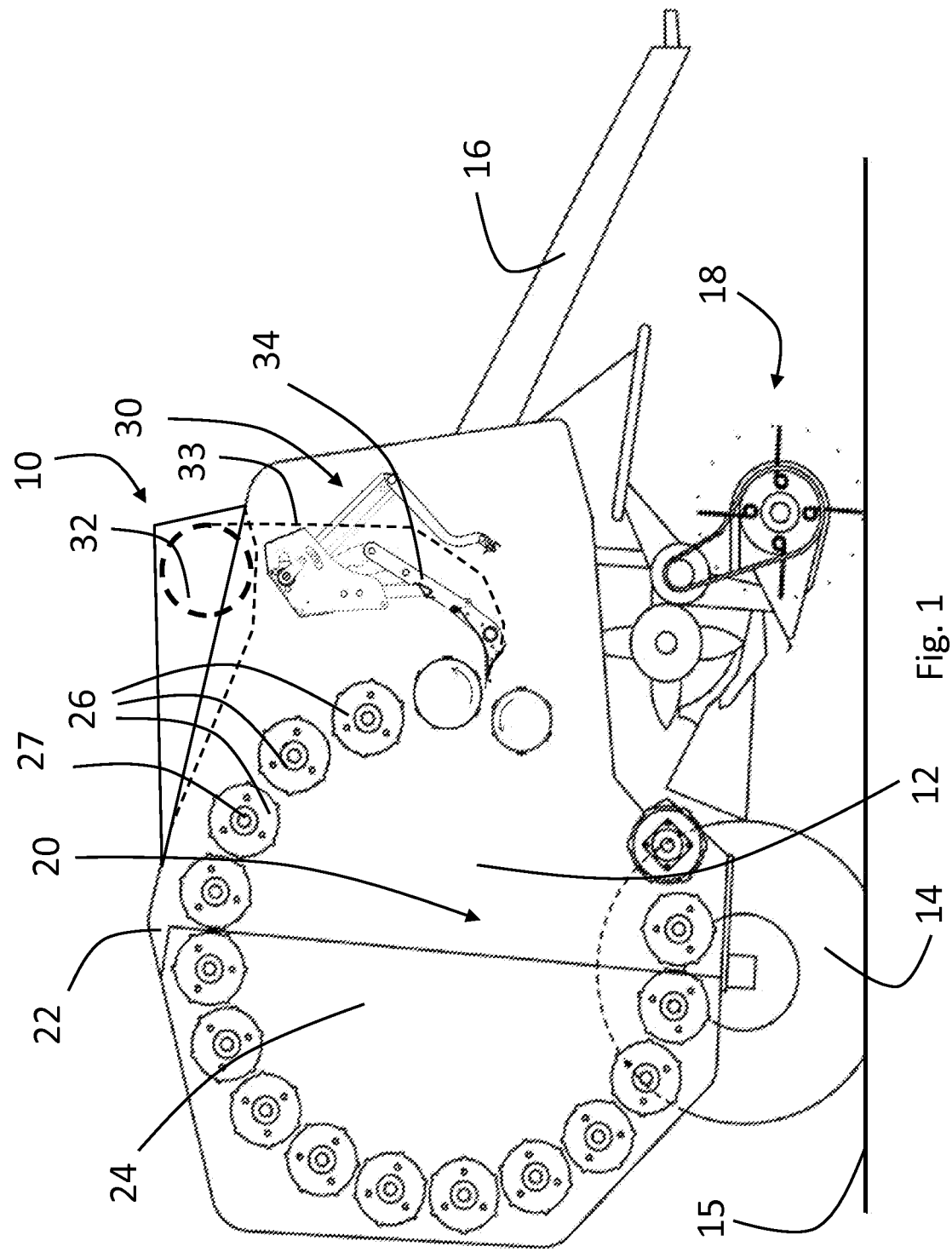
FIG. 1 a schematic side view of a round agricultural baler with baling rollers.

A round baler 10, schematically shown in FIG. 1, comprises a first housing part 12, which is supported, by means of wheels 14, on the ground 15, and is connected, by means of a towing bar 16, to a nondepicted towing vehicle, for example, a tractor.

On a front, lower side of the first housing part 12, in a forwards travelling direction, there is, in a known manner, a picking and feeding device 18 for crops, wherein the first housing part 12 surrounds a front part of a baling chamber 20. On the back, upper corner area of the first housing part 12, there is a bearing 22 for a swiveling second housing part 24, which surrounds a back part of the baling chamber 20. When opened (not depicted), the second housing part 24 frees an outlet (not shown), by means of which a bale (not shown), pressed by the round baler 10, can be deposited or unloaded or expelled. The swiveling second housing part 24 can be actuated (opened and closed) by means of actuating motors (not depicted) and thus represents an outlet flap for a bale pressed in the baling chamber 20.

The round baler 10, designed with a size-unchangeable baling chamber 20, contains a plurality of pressing elements for the pressing of crops, running parallel to one another in the form of baling rollers 26 (by way of example, here only a few baling rollers 26 were provided with the reference symbol "26"), whose rotation axles 27 in a closed second housing part 24 are laid on a circular arc, and of which at least a few are driven.

Furthermore, the round baler 10 comprises a bale wrapping device 30, which is equipped with a supply roller 32 for wrapping material 33. As wrapping material, a net or also foil can be preferably used. The bale wrapping device 30 comprises a feeding device 34 for the wrapping material 33, by means of which the wrapping material 33 is conducted from the supply roller 32 into the baling chamber 20.

After the actual pressing process—that is, the crop pickup and formation of a round bale by the pressing rollers 26—is concluded, a trip over the ground 15 is interrupted, since the round baler 10 is filled with the round bales and more crops cannot or should not be put into the baling chamber 20. At this time, the bale wrapping device 30 is also activated, and a wrapping process following the pressing process is introduced. By a continuous rotation of the round bale found in the baling chamber 20, the wrapping material 33 is wrapped around the round bale 20. After a wrapping process is concluded, the round bale is dropped onto the ground 15 by opening the outlet flap (second housing part 24) via an unloading ramp (not shown. Then, the trip with the round baler 10 is again taken up and a new pressing process begins.

The baling roller 26 are shown in several embodiment examples in two views in FIGS. 2 to 7, wherein FIGS. 2 and 3, 4 and 5, and 6 and 7 show an embodiment example of a baling roller in accordance with the invention.

Figure 2:
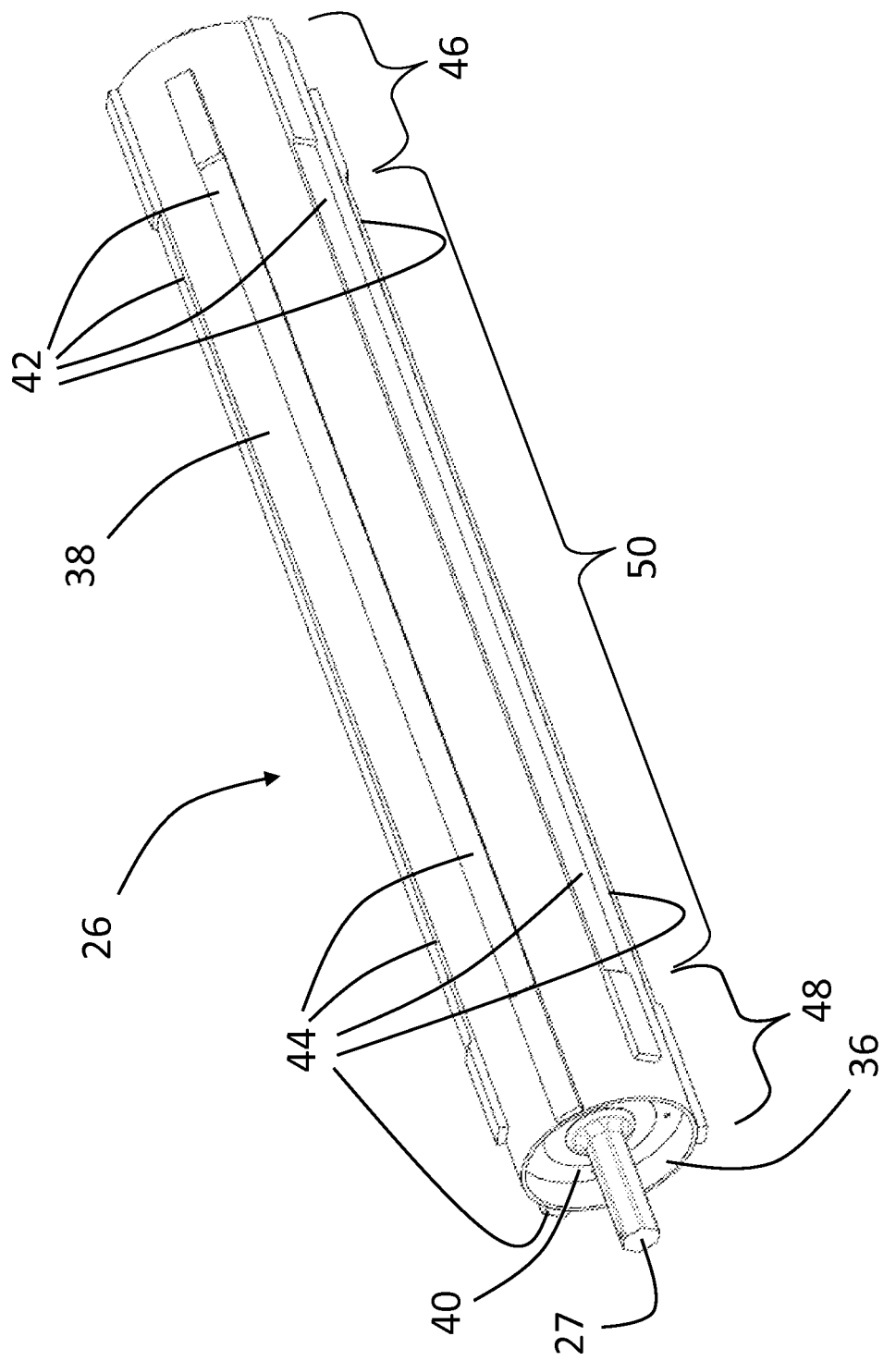
FIG. 2 a schematic perspective side view of a baling roller, in accordance with FIG. 1, in a first embodiment.
Figure 3:
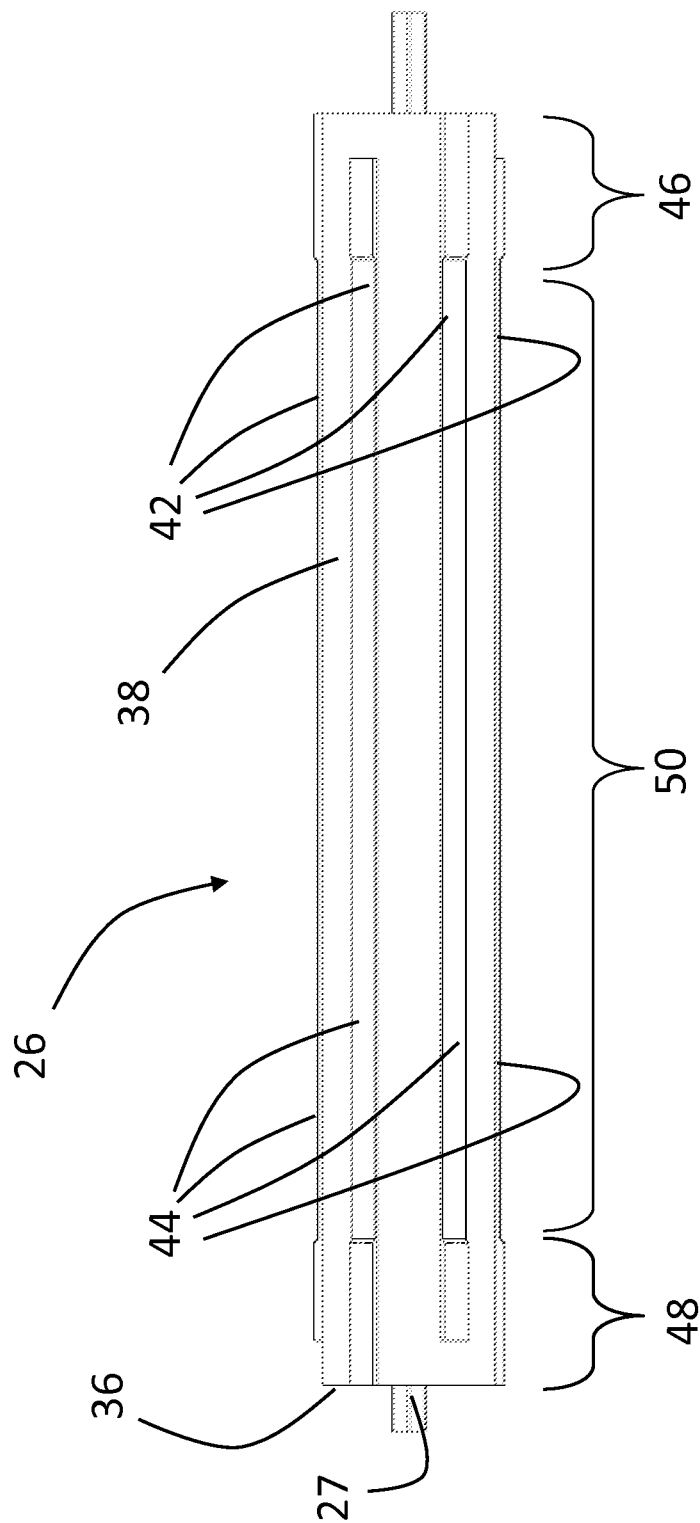
FIG. 3 a schematic side view of the baling roller from FIG. 2.

As shown in FIGS. 2 and 3, the baling roller 26 comprises a roller body 36, which is enclosed by a jacket surface 38 in circumference and length. The roller body 36 is designed as a cylindrical tube profile and can, for example, be formed by a sheet metal material in a formation process or rolling process. On the inside, the roller body 36 has, on its end areas, axle hubs 40, which are fit into the tube profile and are used to hold or support the rotation axles 27.

Elevations 42 are formed on the jacket surface 38; they are made in the form of sheet metal strips 44 by strip-shaped bands, placed on the jacket surface 30. The sheet metal strips 44 extend along the rotation axle 27 (longitudinal axle) of the roller body 36 over essentially the entire length of the roller body 36 and are preferably welded on the jacket surface 38. As already mentioned, it is also possible to directly form the elevations by a sheet metal formation process (for example, by an embossing process or stamping process, or the like) into sheet metal material of the roller body. The sheet metal strips 44 have a changing height profile over the length of the roller body 36, wherein, on the front, the roller body 36 has end areas 46, 48, in which the elevations 42 are more pronounced (that is, are formed higher) than in an area 50 which lies between the end areas 46, 48 of the roller body 36. That means that, in the end areas 46, 48 of the roller body 36, the sheet metal strips 44 or elevations 42 have a greater thickness than in the area 50 lying between the end areas 46, 48. In a baling process, the greater thickness of the sheet metal strips 44 or the elevations 42 in the end areas 46, 48 provides for a greater aggressiveness of the baling rollers 26 in the areas close to the side walls of the baling chamber 20. Accordingly, stronger pressing forces are exerted on a round bale being formed by the end areas 44, 46 of the baling rollers 26 or the roller bodies 36 than by the areas 50 lying between the end areas 46, 48.

Figure 4:
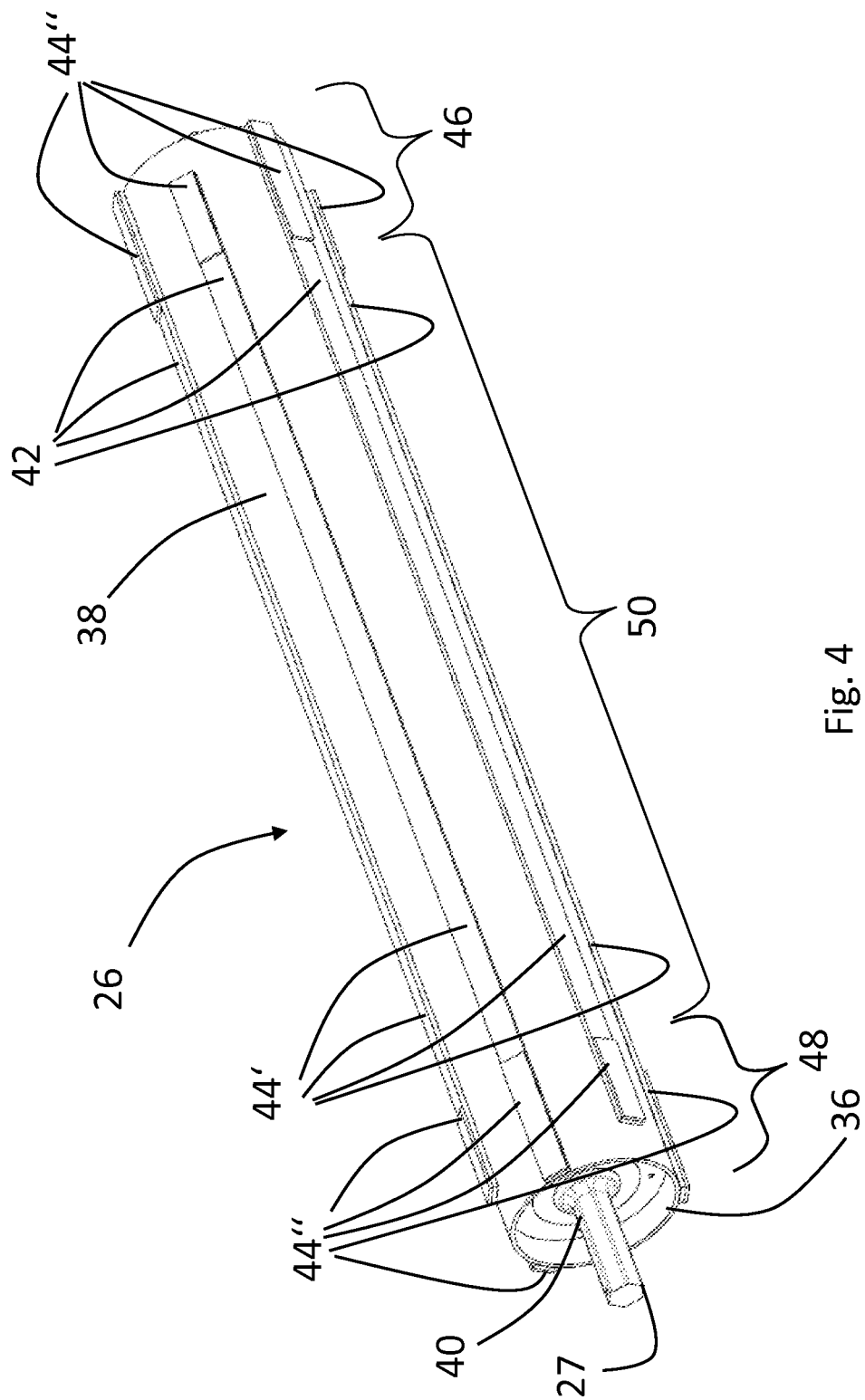
FIG. 4 a schematic perspective side view of a baling roller, in accordance with FIG. 1, in another embodiment.
Figure 5:
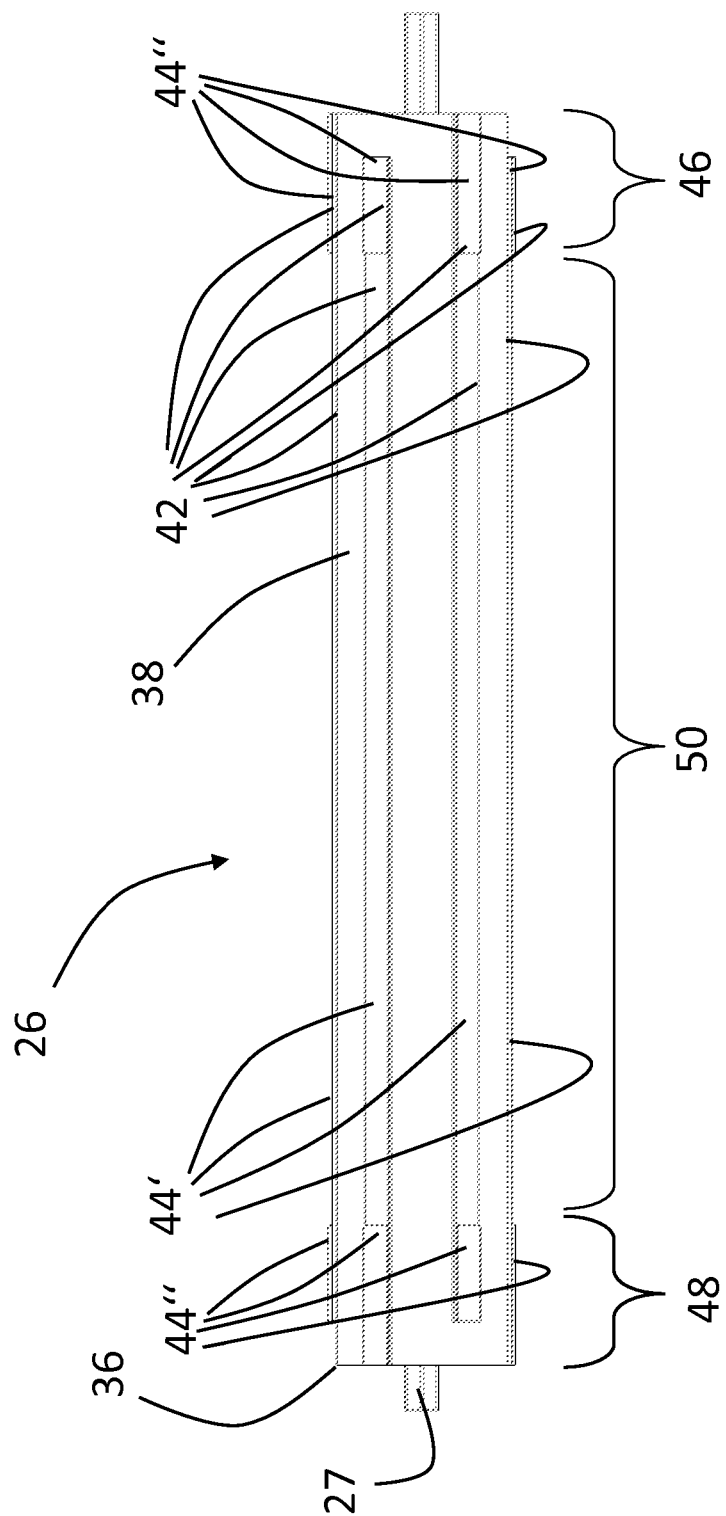
FIG. 5 a schematic side view of the baling roller from FIG. 4.

The embodiment example shown in FIGS. 4 and 5 differs from the embodiment example shown in FIGS. 2 and 3 only in that the elevations 42 are formed by metal sheet strips 44' and 44", which have a height profile which is constant over its length, wherein over the essentially entire length of the roller body 36, a first layer of long sheet metal strips 44' is placed and in the end areas 46, 48, a second layer of short sheet metal strips 44", applied on the first layer, is additionally placed, so that here too, as in the previously mentioned embodiment, the elevations 42 are, as a whole, more pronounced in the end areas 46, 48 (that is, are formed higher) than in area 50, which lies between the end areas 46, 48 of the roller body 36. This variant permits, for example, in a simple and material-economizing manner, the upgrading or modifying of baling rollers with constant elevations which are already present, so as to increase or pronounce more the elevations 42 in the end areas 46, 48 of the roller body 36.

Figure 6:
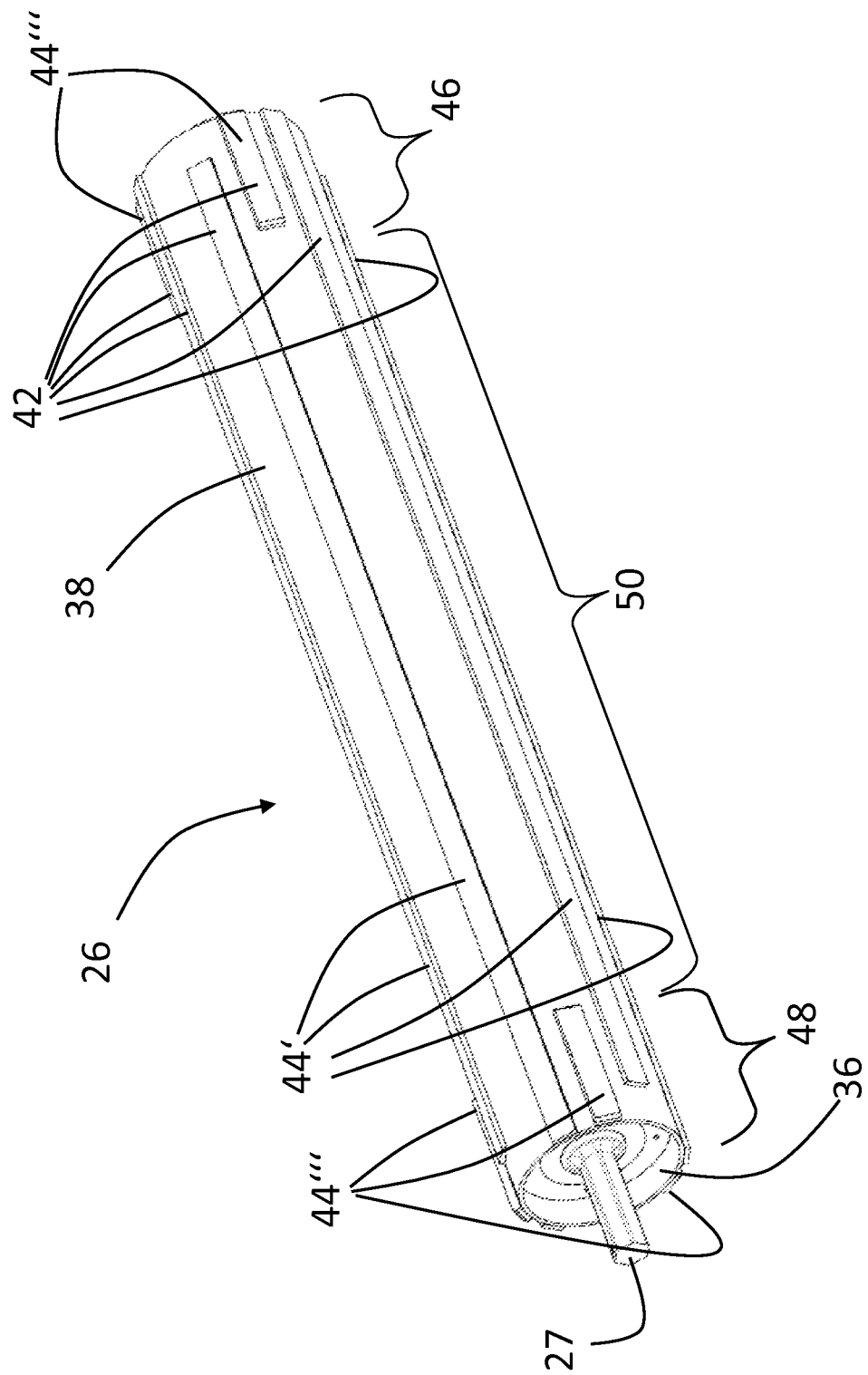
FIG. 6 a schematic perspective side view of a baling roller, in accordance with FIG. 1, in another embodiment.
Figure 7:
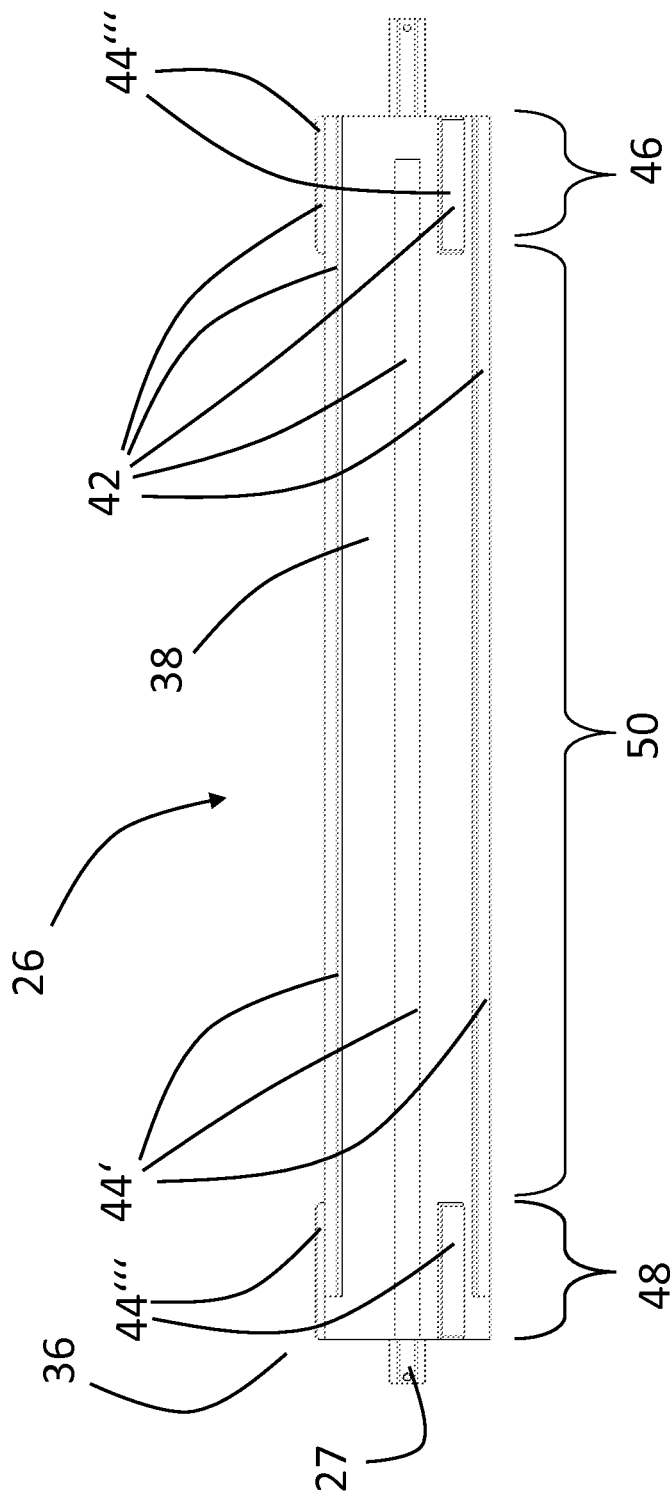
FIG. 7 a schematic side view of the baling roller from FIG. 6.

The embodiment example shown in FIGS. 6 and 7 shows one additional variant, which, in particular, differs, with respect to the variants of the two previous embodiment examples, in that the elevations 42 are formed by sheet metal strips 44' and 44''', which are situated, next to one another in the circumferential direction, in the end areas 46, 48. Over an essentially entire length of the roller body 36, long sheet metal strips 44' with a constant height profile, and in the end areas 46, 48, also short sheet metal strips 44''' are thereby situated next to the long sheet metal strips 44' in the circumferential direction, wherein the short sheet metal strips 44''' likewise have a constant height profile but a greater thickness, so that here too, as in the other two previously mentioned embodiment examples, the elevations 42 in the end areas 46, 48 are more pronounced (that is, are formed higher) than in the area 50, which lies between end areas 46, 48 of the roller body 36. This variant also permits, for example, in a simple and material-economizing manner, the upgrading or modifying of baling rollers with already present constant elevations, so as to increase or make more pronounced the elevations 42 in the end areas 46, 48 of the roller body 36.

The invention claimed is:

1. A baling roller for a round agricultural baler, comprising:
   a roller body with a jacket surface, which encloses the circumference and the length of the roller body, and several longer radially extending elevations, which are located over the circumference and the length of the roller body on the jacket surface, wherein on end areas of the roller body, several shorter radially extending elevations have a greater radial extension than the several longer radially extending elevations, and the several shorter radially extending elevations alternate between the several longer radially extending elevations around the circumference, and wherein the several longer radially extending elevations alternately extend from different ends of the roller body over the length of the roller body, but terminate before reaching the other end of the roller body.

2. The baling roller of claim 1, wherein the several longer radially extending elevations are formed by longer strip-shaped bands and the several shorter radially extending elevations are formed by shorter strip-shaped bands.

3. The baling roller of claim 2, wherein the shorter strip-shaped bands have a greater thickness on the end areas of the roller body than the longer strip-shaped bands.

4. The baling roller of claim 2, wherein the shorter and longer strip-shaped bands are formed on the end areas of the roller body, lying next to one another.

5. A round agricultural baler including a baling chamber comprising:
   a baling roller having a roller body with a jacket surface, which encloses the circumference and the length of the roller body, and several longer radially extending elevations, which are located over the circumference and the length of the roller body on the jacket surface, wherein on end areas of the roller body, several shorter radially extending elevations have a greater radial extension than the several longer radially extending elevations, and the several shorter radially extending elevations alternate between the several longer radially extending elevations around the circumference, and wherein the several longer radially extending elevations alternately extend from different ends of the roller body over the length of the roller body, but terminate before reaching the other end of the roller body.

6. The baler of claim 5, wherein the several longer radially extending elevations are formed by longer strip-shaped bands and the several shorter radially extending elevations are formed by shorter strip-shaped bands.

7. The baler of claim 6, wherein the shorter strip-shaped bands have a greater thickness on the end areas of the roller body than the longer strip-shaped bands.

8. The baler of claim 6, wherein the shorter and longer strip-shaped bands are formed on the end areas of the roller body, lying next to one another.

9. The baling roller of claim 1, wherein the several longer radially extending elevations have a constant height profile along the length of each longer radially extending elevations.

10. The baling roller of claim 1, wherein the several shorter radially extending elevations have a constant height profile along the length of each shorter radially extending elevations.

11. The baler of claim 5, wherein the several longer radially extending elevations have a constant height profile along the length of each longer radially extending elevations.

12. The baler of claim 5, wherein the several shorter radially extending elevations have a constant height profile along the length of each shorter radially extending elevations.

* * * * *